United States Patent

Howey

[11] Patent Number: 5,816,327
[45] Date of Patent: Oct. 6, 1998

[54] PAT HOWEY'S CLINCH LIFTER

[76] Inventor: Patrick E. Howey, 1754 Elaine, Billings, Mont. 59105

[21] Appl. No.: 813,896

[22] Filed: Mar. 7, 1997

[51] Int. Cl.[6] .................................................... A01L 11/00
[52] U.S. Cl. ............................................................ 168/45
[58] Field of Search .................................................. 168/45

[56] References Cited

U.S. PATENT DOCUMENTS

| | | | |
|---|---|---|---|
| 544,540 | 8/1895 | Jopnes | 168/45 |
| 920,834 | 5/1909 | Deevy | 168/45 |
| 929,967 | 8/1909 | Mershimer | 168/45 |
| 1,090,020 | 3/1914 | Broadbooks | 168/45 |
| 1,167,803 | 1/1916 | Desing | 168/45 |
| 5,095,995 | 3/1992 | Emery | 168/45 |

*Primary Examiner*—Thomas Price

[57] ABSTRACT

A tool for unclinching nails from horseshoes, securing said horseshoe from horse's hoof. It is comprised of a top handle with a chisel-like end, generally having a chisel on the end of a lever, a bottom handle comprised of a raised quarter circle, bow down, pivot slot and a flat hook which curls up and attaches to said horseshoe. The top handle slides the chisel end under the clinched nail and lifts it up to a straight position allowing easy removal of the horseshoe.

4 Claims, 3 Drawing Sheets

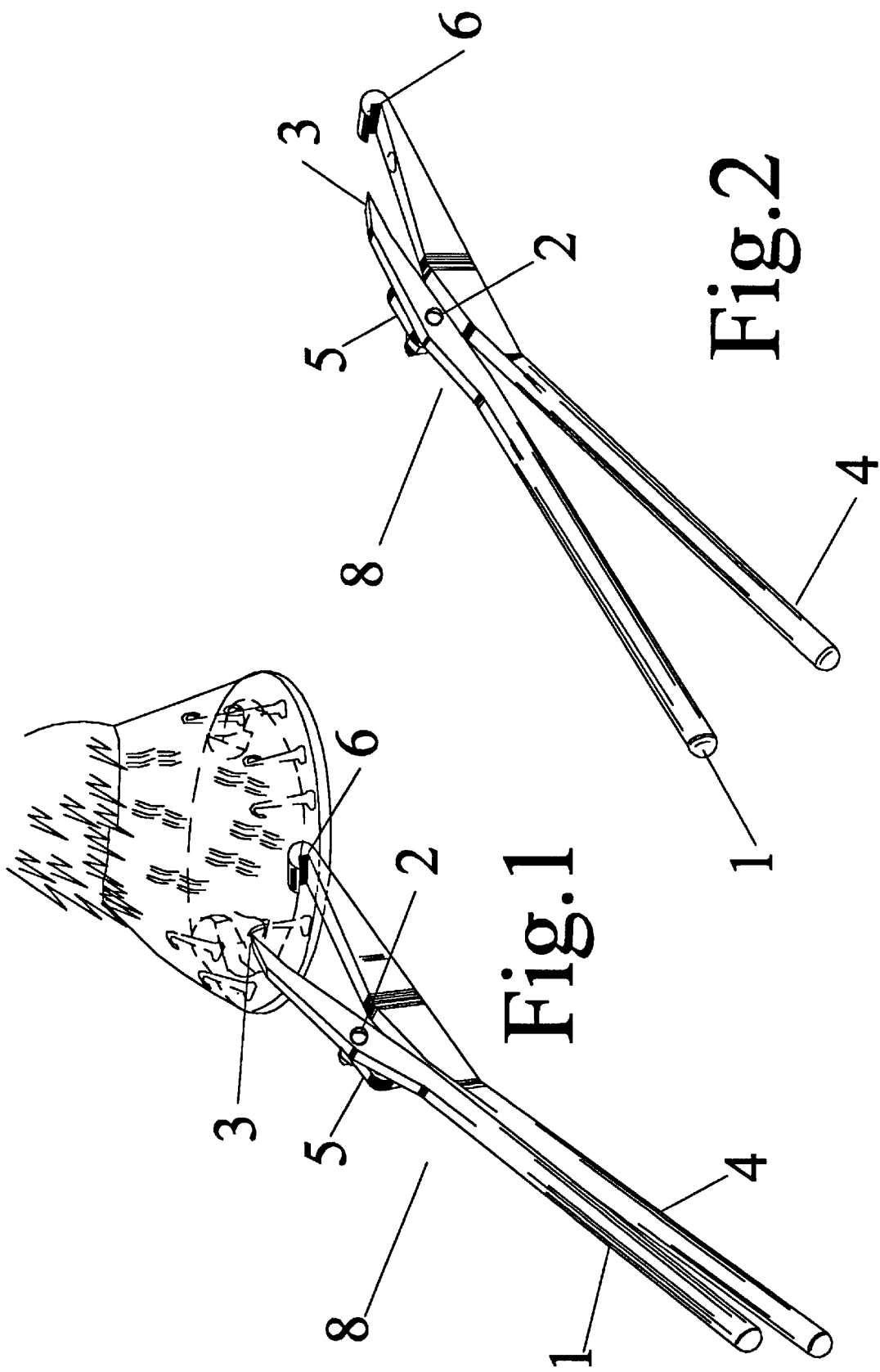

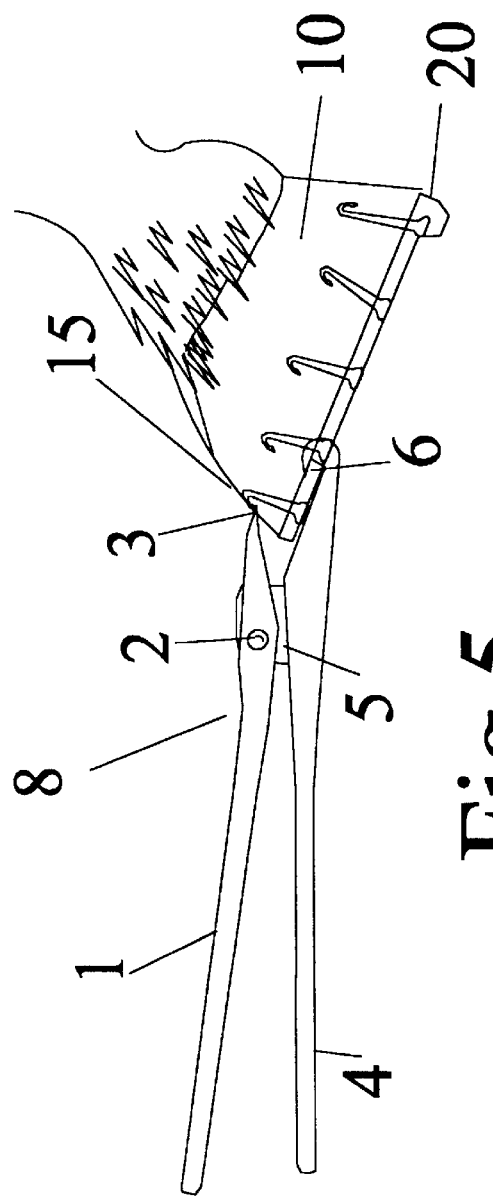
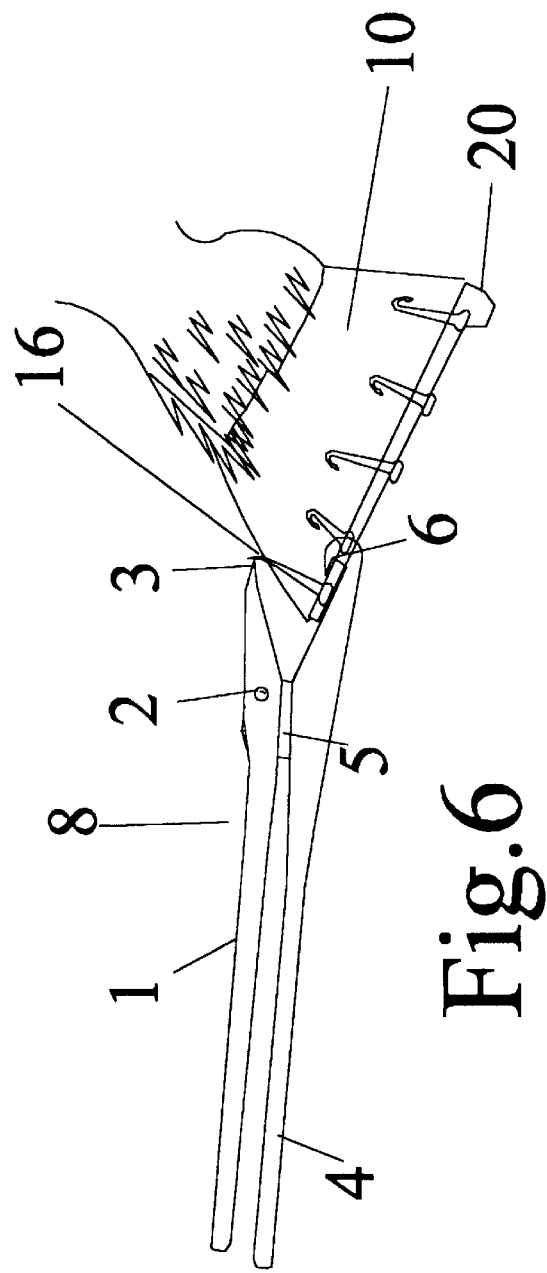

PAT HOWEY'S CLINCH LIFTER

CROSS REFERENCES TO RELATED APPLICATIONS

Reference Document No. 920,834, Date May 1909, Deevy; Document No. 929,967, Date August 1909, Mershimer; and Document No. 1,167,803, Date January 16, Desing, all in Class 168, Sub Class 45, bend over or clinch the nail which the application of the following specification unclinches or straightens the nail thereby releasing the shoe to be pulled off easily.

BACKGROUND OF THE INVENTION

1. Field of Invention

The invention relates to lifting of clinched horseshoe nails.

2. Description of the Prior Art

The traditional tools used by a farrier to unclinch the nail securing the shoe to a horse's hoof is done by a rasp to file off the clinch, thereby leaving no part of the nail bent over the hoof wall to secure the shoe to the horse's hoof and by a clinch cutter, a chisel like instrument in which the farrier places under the clinch and strikes it with a hammer thereby cutting the clinch off, also leaving no part of the nail bent over the hoof wall to secure the shoe to the horse's hoof. Both procedures have their drawbacks. Rasping the clinch tends to weaken the horse's hoof wall, and a clinch cutter tends to aggravate the horse and is awkward to use by a farrier. This invention simply attaches to the shoe upon the horse, lifting the nail clinch to a straight position so the shoe can be easily removed.

SUMMARY OF THE INVENTION

The top handle member, with a chisel-like end, pivots in a raised quarter circle, bow down shaped, pivot slot of the bottom handle member with a hook that slides between the horse's hoof and the secured cinched horseshoe. The top handle member slides down and forward to engage the clinched nail, whereby applying pressure simply lifts the clinched nail by leverage. Therefore, the advantage of the invention is a relatively simple and easy way to remove the clinch without aggravating or harming the horse and a much easier procedure for the farrier.

BRIEF DESCRIPTION OF THE DRAWINGS

In the drawings, wherein similar reference characters denote similar elements throughout the several views:

FIG. 1 is a side view of the invention for unclinching horseshoe nails in a closed position;

FIG. 2 is a perspective view of the invention in an open position;

FIG. 5 is a perspective view of the invention with chisel sliding under nail to be unclinched; and FIG. 6 is a perspective view showing the invention with the straightened unclinched nail.

DESCRIPTION OF THE PREFERRED EMBODIMENTS

Figure 3:
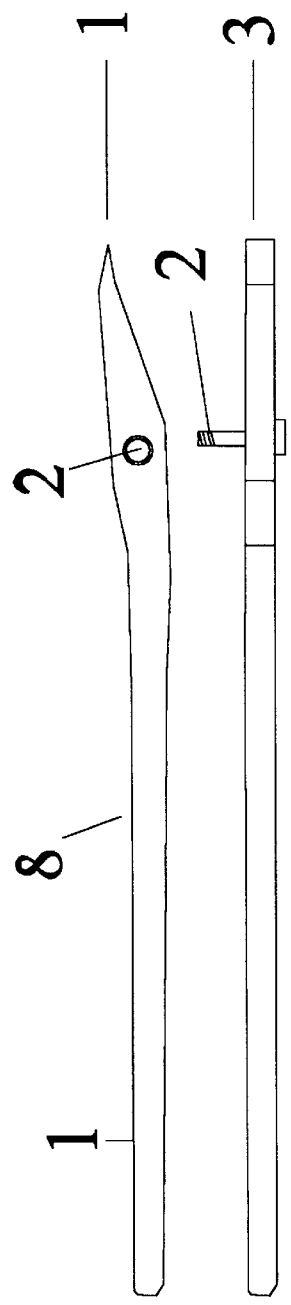
FIG. 3 is a side and top view fragment of top member of the invention.

As shown in FIG. 1, the present tool 8 has top and bottom handles 1 and 4. The top handle 1 has a chisel-like end, 3, and a pin 2. The bottom handle 4 has a raised quarter circle, bow down, pivot slot 5 and a hook at the end 6. Said tool 8 is in closed position.

As shown in FIG. 2, the present tool 8 has top and bottom handles, 1 and 4, the top handle 1 with a chisel-like end, 3, and a pin 2. The bottom handle 4 has a raised quarter circle, bow down, pivot slot 5 with a hook on its end 6. Said tool 8 pivots with Pin 2 into a raised quarter circle, bow down, pivot slot 5 which is in open position.

FIG. 3 illustrates the invention tool 8 segregated top handle 1 with side and top views showing pin placement 2 and chisel-like end 3.

Figure 4:
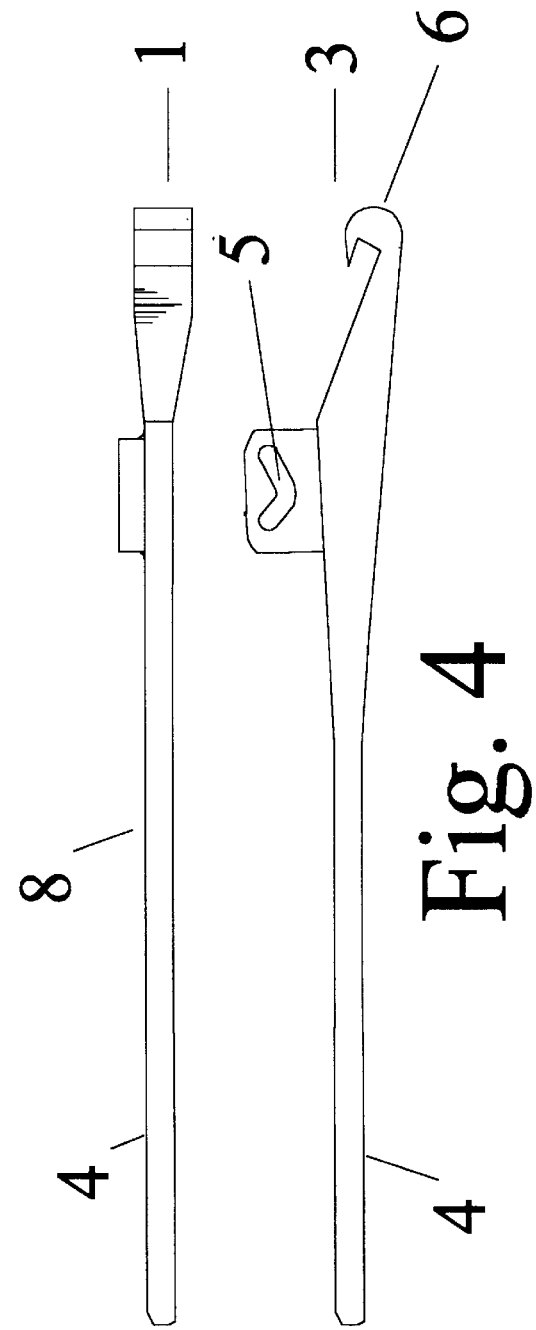
FIG. 4 is a side and bottom view fragment of the invention.

FIG. 4 shows the invention tool 8 segregated bottom handle 4 with its raised quarter circle, bow down, pivot slot 5 and its hook 6 in bottom and side views.

FIG. 5 illustrates the tool 8 attached to horseshoe 20 that is attached to horse's hoof 10 with its top handle 1 with its pivot pin 2 and chisel-like end 3 that pivots with bottom handle 4 within its raised quarter circle, bow down, pivot slot 5 and end hook 6, attached to horseshoe 20 in open engaged position to lift clinch 15 from horse's hoof 10.

FIG. 6 illustrates the tool 8 is attached to horseshoe 20 that is attached to horse's hoof 10 with its top handle 1 with its pivot pin 2 and chisel-like end 3 pivots with bottom handle 4 within its raised quarter circle, bow down, pivot slot 5 and end hook 6 attached to horseshoe 20 in finished closed position where clinch is lifted 16 from horse's hoof 10.

Having shown and described the preferred embodiments of the invention, it will be apparent to those skilled in the art that many modifications could be made without departing from the spirit, scope and inventive concepts. Accordingly, neither this patent nor the protection it provides should be limited to precise embodiments previously shown and described, but only to the full scope of the following claims.

What is claimed is:

1. An unclinching tool comprising:

a first handle having a chisel-like end;

a second handle having a hook, pivotally joined together within a raised quarter circle, bow down, pivot slot.

2. The tool of claim 1 with first handle having a chisel-like end also carries a pin to join together with the bottom handle.

3. The tool of claim 1 with the second or bottom handle having a hook, curls up to attach to horseshoe.

4. The tool of claim 1 with the second or bottom handle having a hook, curls up and also has a raised quarter circle, bow down, pivot slot in which resides the pin of the first handle which pivotally joins the two members together to make up the tool.

* * * * *